United States Patent
Lin

(10) Patent No.: US 10,412,360 B2
(45) Date of Patent: Sep. 10, 2019

(54) WIRELESS TRANSMISSION SYSTEM, METHOD AND DEVICE FOR STEREOSCOPIC VIDEO

(71) Applicant: Wistron Corporation, New Taipei (TW)

(72) Inventor: Chih-Chung Lin, New Taipei (TW)

(73) Assignee: Wistron Corporation, New Taipei (TW)

( * ) Notice: Subject to any disclaimer, the term of this patent is extended or adjusted under 35 U.S.C. 154(b) by 188 days.

(21) Appl. No.: 15/075,204

(22) Filed: Mar. 21, 2016

(65) Prior Publication Data

US 2017/0142388 A1    May 18, 2017

(30) Foreign Application Priority Data

Nov. 18, 2015   (TW) .............................. 104138076 A

(51) Int. Cl.
*H04N 13/117*    (2018.01)
*H04L 29/06*    (2006.01)
(Continued)

(52) U.S. Cl.
CPC ....... *H04N 13/117* (2018.05); *H04L 65/4069* (2013.01); *H04L 65/604* (2013.01);
(Continued)

(58) Field of Classification Search
None
See application file for complete search history.

(56) References Cited

U.S. PATENT DOCUMENTS 9,716,920 B2 *  7/2017  Chen .................... H04N 19/597
2010/0002750 A1 * 1/2010  Hardacker ............ H04L 27/368
                                               375/133
(Continued)

FOREIGN PATENT DOCUMENTS

CN    102497564    6/2012
TW    201349848    12/2013
TW    201501510    1/2015

OTHER PUBLICATIONS

"Office Action of Taiwan Counterpart Application" with English translation thereof, dated Oct. 14, 2016, p. 1-p. 10, in which the listed references were cited.
(Continued)

*Primary Examiner* — Kate H Luo
(74) *Attorney, Agent, or Firm* — JCIPRNET

(57) ABSTRACT

A wireless transmission system, method and device for stereoscopic video are provided. The wireless transmission system includes a wireless transmission device and multiple user devices communicating with the wireless transmission device. Each of the user devices receives a stereoscopic video stream corresponding to a user visual angle. The stereoscopic video stream is composed of multiple views of multiple visual angles. The wireless transmission device obtains the user visual angle for the stereoscopic video stream and a modulation type of each of the user devices respectively, selects multiple transmission visual angles among the multiple visual angles according to the user visual angles, and transmits the stereoscopic video stream corresponding to the transmission visual angles to the corresponding user devices respectively by adjusting the modulation type of the user devices.

9 Claims, 5 Drawing Sheets

(51) Int. Cl.
  *H04N 13/194*    (2018.01)
  *H04W 4/80*    (2018.01)
  *H04L 27/00*    (2006.01)

(52) U.S. Cl.
  CPC ....... *H04N 13/194* (2018.05); *H04L 27/0008* (2013.01); *H04W 4/80* (2018.02)

(56) References Cited

U.S. PATENT DOCUMENTS

| | | | | |
|---|---|---|---|---|
| 2012/0044330 | A1* | 2/2012 | Watanabe | G02B 27/2214 348/54 |
| 2013/0021331 | A1* | 1/2013 | Tsukagoshi | A61B 6/022 345/419 |
| 2013/0307941 | A1* | 11/2013 | Takimoto | H04N 13/366 348/51 |
| 2014/0079099 | A1* | 3/2014 | Nishikawa | H04L 1/0003 375/219 |
| 2014/0368495 | A1 | 12/2014 | Wei et al. | |
| 2016/0191892 | A1* | 6/2016 | Sobolev | H04N 13/194 348/43 |

OTHER PUBLICATIONS

"Office Action of China Counterpart Application", dated Dec. 27, 2018, p. 1-p. 12.

* cited by examiner

WIRELESS TRANSMISSION SYSTEM, METHOD AND DEVICE FOR STEREOSCOPIC VIDEO

CROSS-REFERENCE TO RELATED APPLICATION

This application claims the priority benefit of Taiwan application serial no. 104138076, filed on Nov. 18, 2015. The entirety of the above-mentioned patent application is hereby incorporated by reference herein and made a part of this specification.

BACKGROUND OF THE INVENTION

Field of the Invention

The invention relates to a video transmission technique using wireless communication, and particularly to a wireless transmission system, method and device for stereoscopic video.

Description of Related Art

Current 3D video display techniques allow a user to view a stereoscopic video from different selectable visual angles and thus to selectively enjoy visual and audio effects of the stereoscopic video from different visual angles. For example, when watching a soccer game video displayed in 3D, the user may select many different angles as visual angles (e.g., in front of, behind, on the left of, or on the right of the ball) for watching the game so as to enjoy the fun of watching the game from different positions. The 3D video display techniques generally combine a plurality of 2D images of a specific object or scene that are taken at different visual angles to generate a 3D stereoscopic video, and stereoscopically display the object or scene at human eyes through hardware display techniques for 3D video.

However, whether a video stream is composed of a plurality of 2D images or 3D stereoscopic videos, a larger amount of network bandwidth is required for transmission of the video stream. When a plurality of user devices intend to display the same 3D stereoscopic video of different visual angles at the same time through wireless communication techniques, the visual angles desired by each user device for the 3D stereoscopic video may differ. Although it is possible to transmit all views to the users, such approach not only causes a waste of bandwidth but also reduces transmission efficiency. In order to save the bandwidth and enhance transmission efficiency, generally, different video streams are provided to the user devices according to different visual angles. Nonetheless, due to bandwidth limitations in the wireless communication techniques, when a plurality of user devices in a wireless network receive the same 3D stereoscopic video stream of different visual angles at the same time, transmission delay may occur.

Therefore, if a plurality of user devices desire to view the same 3D stereoscopic video stream of different visual angles at the same time using wireless communication techniques, the problem of large bandwidth consumption of the video stream may need to be solved, otherwise it will be difficult for these user devices to instantly and simultaneously display the stereoscopic video.

SUMMARY OF THE INVENTION

The invention provides a wireless transmission system, method and device for stereoscopic video that are capable of reducing both network traffic and bandwidth consumed in stereoscopic video stream transmission when a plurality of user devices are viewing a specific stereoscopic video stream at the same time through a wireless communications protocol.

A wireless transmission system for stereoscopic video according to an embodiment of the invention includes a wireless transmission device and a plurality of user devices. The user devices communicate with the wireless transmission device. Each user device is configured to receive a stereoscopic video stream corresponding to a user visual angle, and the stereoscopic video stream is composed of a plurality of views of a plurality of visual angles. The wireless transmission device obtains the user visual angle for the stereoscopic video stream and a modulation type of each user device respectively, selects a plurality of transmission visual angles among the visual angles according to the user visual angles of the user devices, and transmits the stereoscopic video stream corresponding to the transmission visual angles to the corresponding user devices respectively by adjusting the modulation type of the user devices.

In an embodiment of the invention, when the user visual angle of the user device is not among the transmission visual angles, the user device receives the stereoscopic video streams corresponding to the transmission visual angles adjacent to the user visual angle, and performs video interpolation on the stereoscopic video streams corresponding to the transmission visual angles adjacent to the user visual angle, so as to generate the stereoscopic video stream corresponding to the user visual angle.

A wireless transmission method for stereoscopic video according to an embodiment of the invention includes the following steps. Communication is performed with a plurality of user devices so as to obtain a user visual angle for a stereoscopic video stream and a modulation type of each user device respectively. Each user device is configured to receive the stereoscopic video stream corresponding to the user visual angle, and the stereoscopic video stream is composed of a plurality of views of a plurality of visual angles. A plurality of transmission visual angles are selected among the visual angles according to the user visual angles of the plurality of user devices. In addition, the modulation type of the user devices is adjusted, so that the stereoscopic video stream corresponding to the transmission visual angles is transmitted to the corresponding user devices respectively.

A wireless transmission device for stereoscopic video according to an embodiment of the invention includes a wireless transmission module and a control unit. The wireless transmission module communicates with a plurality of user devices. Each user device is configured to receive a stereoscopic video stream corresponding to a user visual angle, and the stereoscopic video stream is composed of a plurality of views of a plurality of visual angles. The control unit is coupled to the wireless transmission module. The control unit obtains the user visual angle for the stereoscopic video stream and a modulation type of each user device respectively through the wireless transmission module, selects a plurality of transmission visual angles among the visual angles according to the user visual angles of the user devices, and transmits the stereoscopic video stream corresponding to the transmission visual angles to the corresponding user devices respectively by adjusting the modulation type of the user devices.

Based on the above, according to the embodiments of the invention, when a plurality of user devices are viewing a specific stereoscopic video stream of a plurality of visual angles at the same time through a wireless communications protocol, the wireless transmission device obtains a user visual angle of each user device for this specific stereoscopic video stream so as to select transmission visual angles that has to be transmitted and their corresponding specific stereoscopic video stream. The user device that desires to receive the transmission visual angles (i.e., the user visual angle of the user device is among the transmission visual angles) directly receives the specific stereoscopic video stream corresponding to the transmission visual angles, while some of the user devices receive the specific stereoscopic video stream corresponding to the visual angles adjacent to their user visual angles and generate the specific stereoscopic video stream of their user visual angles by themselves using video interpolation techniques. Accordingly, by means of the wireless transmission system, method and device according to the embodiments of the invention, all the user devices obtain their desired stereoscopic video stream without affecting resolution of the stereoscopic video stream, and network traffic and the bandwidth consumed in transmission of the stereoscopic video stream can be effectively reduced.

To make the above features and advantages of the invention more comprehensible, embodiments accompanied with drawings are described in detail as follows.

DETAILED DESCRIPTION OF DISCLOSED EMBODIMENTS

Figure 1:
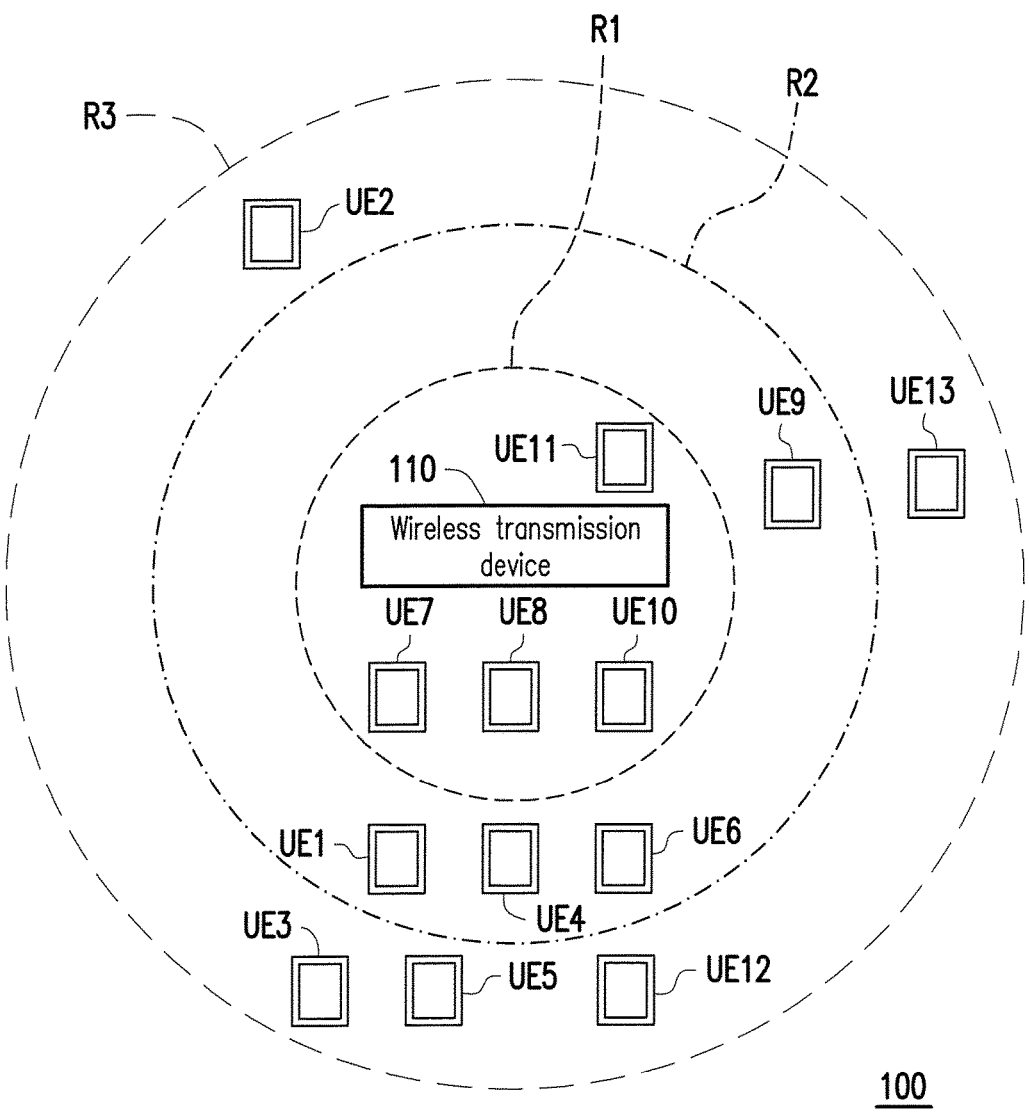
FIG. 1 is a schematic diagram of a wireless transmission system for stereoscopic video according to an embodiment of the invention.

FIG. 1 is a schematic diagram of a wireless transmission system 100 for stereoscopic video according to an embodiment of the invention. The wireless transmission system 100 includes a wireless transmission device 110 and a plurality of user devices UE1 to UE13. In the present embodiment, each of the user devices UE1 to UE13 communicates with the wireless transmission device 110. The wireless transmission device 110 may be a wireless access point that complies with a wireless communications protocol, or a cloud server apparatus. This wireless communications protocol may be a WiFi protocol, a ZigBee protocol, a Bluetooth protocol, or a protocol that allows a single base station to communicate with a plurality of user devices at the same time.

The user devices UE1 to UE13 may be consumer electronic equipment such as smart mobile devices, table PCs, notebook computers, and handheld game devices, etc., having a function of communicating with the wireless transmission device 110, and including hardware (e.g., wearable 3D glasses, autostereoscopic 3D techniques, etc.) for displaying 3D videos.

In the present embodiment, it is assumed that the wireless transmission device 110 provides a stereoscopic video stream of a plurality of visual angles. The stereoscopic video stream is usually composed of a plurality of views of a plurality of visual angles. Generally, since the stereoscopic video viewed from each visual angle differs slightly from the others, the stereoscopic video stream of each visual angle is individually and independently transmitted to the requesting user devices UE1 to UE13, or all the views in this stereoscopic video stream corresponding to each visual angle are transmitted to the user devices UE1 to UE13 so that the user devices UE1 to UE13 generate the stereoscopic video of their respective desired visual angles by themselves. However, when the above method is used to transmit stereoscopic video streams, an excessive amount of network bandwidth may be consumed.

According to the embodiments of the invention, stereoscopic videos or views corresponding to adjacent visual angles surely have many similar partial images, and the user device obtains a stereoscopic video of a desired visual angle by use of the stereoscopic videos or views corresponding to adjacent visual angles through video interpolation techniques. Therefore, in order to reduce network traffic and the bandwidth consumed in stereoscopic video stream transmission, in the embodiments of the invention, when the user devices UE1 to UE13 are viewing a specific stereoscopic video stream of a plurality of visual angles at the same time through a wireless communications protocol, the wireless transmission device 110 obtains a user visual angle of each of the user devices UE1 to UE13 for this specific stereoscopic video stream so as to select a transmission visual angle that has to be transmitted and its corresponding specific stereoscopic video stream. If a desired visual angle of the user device is among a plurality of the transmission visual angles that have to be transmitted, the stereoscopic video can be directly displayed by reception of the specific stereoscopic video stream corresponding to the desired visual angle. If the desired visual angle of the user device is not among the transmission visual angles that have to be transmitted, the specific stereoscopic video stream of a visual angle adjacent to the desired visual angle is received, and the specific stereoscopic video stream of the desired visual angle is generated by the user device itself using video interpolation techniques. Examples in accordance with the spirit of the embodiments of the invention are presented hereinafter. Persons who apply these embodiments may suitably realize or develop other embodiments according to the disclosure of the embodiments of the invention.

Referring again to FIG. 1, when the wireless transmission device 110 and the user devices UE1 to UE13 communicate with each other, a modulation type of the wireless communications protocol is determined based on a distance between the wireless transmission device 110 and each of the user devices UE1 to UE13 or the degree of wireless transmission interference, thereby reducing the chances of wireless interference. This modulation type is classified based on a transmission frequency between the wireless transmission device 110 and the user devices UE1 to UE13. For example, the modulation type includes one of binary phase-shift keying (BPSK), quadrature phase-shift keying (QPSK), 16 quadrature amplitude modulation (16QAM) and 64 quadrature amplitude modulation (64QAM). The BPSK type has the best performance in noise reduction (high signal-to-noise ratio (SNR)). Even if a signal is severely distorted during transmission, when the signal is subjected to demodulation, an error can be avoided as much as possible. However, the BPSK type is only capable of transmitting a 1-bit signal each time, i.e., it is only capable of transmitting data "0" or "1" each time. Accordingly, the highest transmission frequency is required in order to perfoini wireless communication by BPSK. In other words, when classification is made based on transmission frequency, the BPSK type has the highest transmission frequency, followed by the QPSK type, the 16QAM type and the 64QAM type (having the lowest transmission frequency). In FIG. 1 of the present embodiment, three ranges R1, R2 and R3 centering around the wireless transmission device 110 are illustrated, respectively representing short to long distances from the user devices UE1 to UE13 to the wireless transmission device 110. The user devices UE7, UE8, UE10 and UE11 within the range R1 are closer to the wireless transmission device 110, and thus adopt 16QAM having a lower transmission frequency as the modulation type. The user devices UE1, UE4, UE6 and UE9 between the ranges R1 and R2 are farther away from the wireless transmission device 110, and thus adopt QPSK as the modulation type. The user devices UE2, UE3, UE5, UE12 and UE13 between the ranges R3 and R3 are even farther away from the wireless transmission device 110, and thus adopt BPSK having the highest transmission frequency as the modulation type.

In addition, each of the user devices UE1 to UE13 receives a wireless signal (herein, a stereoscopic video stream) transmitted using a modulation type having the transmission frequency not lower than a predetermined transmission frequency. For example, if the modulation type of the user device UE1 is QPSK, the user device UE1 receives wireless signals transmitted using BPSK and QPSK; if the modulation type of the user device UE7 is 16QAM, the user device UE7 receives wireless signals transmitted using BPSK, QPSK and 16QAM. That is, the user devices UE1 to UE13 not only receive wireless information through a predetermined modulation type, but also receive wireless information of a modulation type having a higher transmission frequency.

Figures 2, 3:
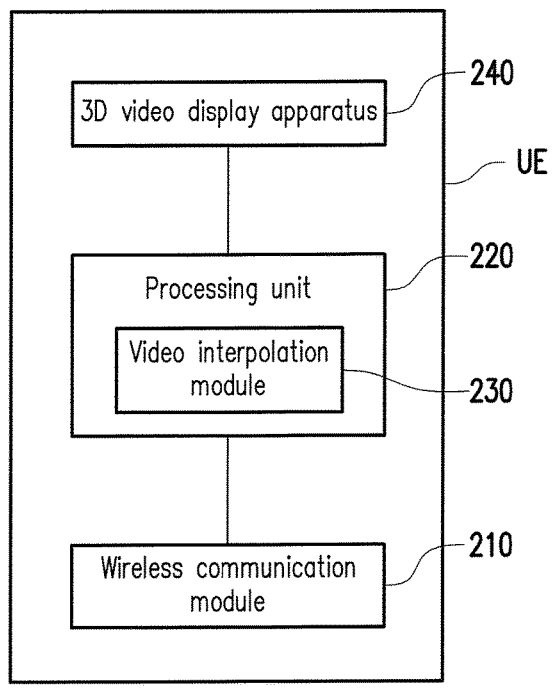
FIG. 2 is a functional block diagram of one of user devices according to an embodiment of the invention.
FIG. 3 is a schematic diagram of user visual angles for a stereoscopic video stream desired to be obtained by user devices UE1 to UE13 and modulation types adopted according to an embodiment of the invention.

FIG. 2 is a functional block diagram of one user device UE according to an embodiment of the invention. The user device UE of the present embodiment mainly includes a wireless communication module 210, a processing unit 220, and a 3D video display apparatus 240. The wireless communication module 210 is a collaborative hardware computing apparatus that complies with the aforementioned wireless communications protocol and includes a communication chip, an antenna, and a noise reduction apparatus, etc. The processing unit 220 obtains a wireless signal from the wireless transmission device 110 in FIG. 1 through the wireless communication module 210. The 3D video display apparatus 240 may be hardware such as wearable 3D glasses, an autostereoscopic 3D module, etc. The processing unit 220 may be a central processing unit (CPU), a graphics processor, or a processing chip, etc.

The processing unit 220 includes a video interpolation module 230. The video interpolation module 230 performs video interpolation on the stereoscopic video stream corresponding to a transmission visual angle adjacent to a desired visual angle, so as to generate the stereoscopic video stream of the desired visual angle. The video interpolation module 230 is implemented as a processor in combination with corresponding software or firmware. The video interpolation module 230 of the present embodiment is implemented using depth-image-based rendering (DIBR) techniques. If the user device UE fails to receive a view of a visual angle, the missing view of this visual angle can be repaired using views corresponding to visual angles on the left and right of this visual angle, so that the stereoscopic video can be continuously displayed. The video interpolation module 230 of the present embodiment that uses the DIBR techniques allows the user device UE to determine an acceptable visual angle range for video interpolation. For example, if the visual angle range is set to 3, when a view of a certain visual angle is to be repaired, views of a left visual angle and a right visual angle with a difference of 3 (i.e., the visual angle range (3) minus 1) therebetween are used collaboratively to repair the missing view between the two visual angles so as to complete the stereoscopic video. When the visual angle range is larger than 3, e.g., 4 or 5, the view obtained by interpolation may become more blurred and have lower resolution. On the other hand, when the visual angle range is smaller than 3, e.g., 2, the view obtained by interpolation may have higher resolution.

An example is given to further illustrate how the wireless transmission device 110 selects the transmission visual angle to be transmitted among the visual angles according to the user visual angles desired by the user devices UE1 to UE13. FIG. 3 is a schematic diagram of the user visual angles for a stereoscopic video stream desired to be obtained by the user devices UE1 to UE13 and modulation types adopted according to an embodiment of the invention. When the user devices UE1 to UE13 desire to obtain a specific stereoscopic video stream of different visual angles, they send a stereoscopic video obtaining request to the wireless transmission device 110. Take the user devices UE1 for example. This stereoscopic video obtaining request includes an identification code of the user device UE1, the specific stereoscopic video stream, the user visual angle corresponding to the specific stereoscopic video stream desired by the user device UE1, and the modulation type between the wireless transmission device 110 and the user device UE1. Or, the wireless transmission device 110 is responsible for transmitting the stereoscopic video to the user devices within a wireless transmission range of the wireless transmission device 110.

To facilitate illustration of the embodiments of the invention, FIG. 3 describes the desired user visual angle and the modulation type of each of the user devices UE1 to UE13. In the embodiments of the invention, the specific stereoscopic video stream is viewed from a plurality of visual angles V1 to V16, wherein these successively numbered visual angles V1 to V16 are adjacent to one another. In other words, this stereoscopic video is composed of views of sixteen visual angles (i.e., V1 to V16). For example, the visual angles adjacent to the visual angle V2 are the visual angles V1 and V3, and those adjacent to the visual angle V14 are the visual angles V13 and V15, and so on. The user visual angles desired by the user devices UE1, UE4, UE6 and UE9 are V1, V4, V6 and V11, respectively, and the modulation type thereof is QPSK; the user visual angles desired by the user devices UE2, UE3, UE5, UE12 and UE13 are V2, V3, V5, V15 and V16, respectively, and the modulation type thereof is BPSK; the user visual angles desired by the user devices UE7, UE8, UE10 and UE11 are V7, V10, V13 and V14, respectively, and the modulation type thereof is 16QAM. No user device desires to use the visual angles V8, V9 and V12, and thus there is no need for transmission.

In the present embodiment, the user devices UE1 to UE13 all perform video interpolation using the DIBR techniques, and the visual angle range is set to 3 for repair of the views of missing visual angles. The user devices UE1 to UE13 may perform video interpolation with the DIBR techniques. The wireless transmission device of the embodiments of the invention determines whether the visual angles V1 to V16 are among the transmission visual angles one by one. In practice, brute-force comparison analysis or multivariate analysis may be used to find the best combination of transmission visual angles among the user visual angles (the visual angles V1 to V16 except V8, V9 and V12), and transmits the stereoscopic video stream corresponding to these transmission visual angles to the corresponding user devices UE1 to UE13 respectively. Accordingly, each of the user devices UE1 to UE13 generates the stereoscopic video stream of a desired user visual angle using the views or stereoscopic videos of the transmission visual angles.

Figure 4:
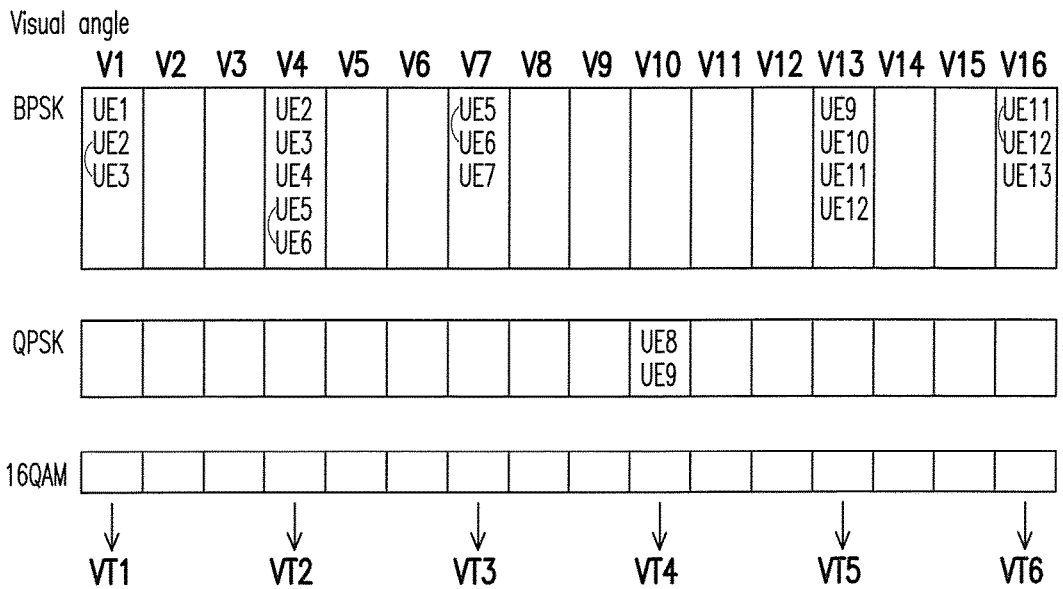
FIG. 4 is a schematic diagram of transmission visual angles that are provided to the user devices UE1 to UE13 and the modulation types adopted after adjustment by means of a wireless transmission device according to an embodiment of the invention.

FIG. 4 is a schematic diagram of transmission visual angles that are provided to the user devices UE1 to UE13 and the modulation types adopted after adjustment by means of the wireless transmission device 110 according to an embodiment of the invention. It is known from FIG. 4 that the selected transmission visual angles VT1 to VT6 were originally visual angles V1, V4, V7, V10, V13 and V16 respectively. The user devices UE1 and UE4 originally received signals using the QPSK modulation type, and can also receive the stereoscopic video stream of the visual angles V1 and V4 using BPSK that has a higher transmission frequency. Both the user devices UE2 and UE3 receive the stereoscopic video stream (including views or stereoscopic videos of the visual angles V1 and V4) of the visual angles V1 and V4 using BPSK, and obtain the stereoscopic video stream of original visual angles V2 and V3 respectively through video interpolation techniques. Both the user devices UE5 and UE6 receive the stereoscopic video stream (including views or stereoscopic videos of the visual angles V4 and V7) of the visual angles V4 and V7 using BPSK, and obtain the stereoscopic video stream of original visual angles V5 and V6 respectively through video interpolation techniques. The user device UE7 originally received signals using the 16QAM modulation type, and thus can also receive the stereoscopic video stream of the visual angle V7 using BPSK that has a higher transmission frequency. The user device UE8 originally received signals using the 16QAM modulation type, and thus can also receive the stereoscopic video stream of the visual angle V10 using QPSK that has a higher transmission frequency. The user device UE9 receives the stereoscopic video stream of the visual angle V10 using QPSK and receives the stereoscopic video stream of the visual angle V13 using BPSK, and obtains the stereoscopic video stream of original visual angle V11 through video interpolation techniques. The user devices UE10 and UE13 receive the stereoscopic video stream of the desired visual angles V13 and V16 respectively using BPSK that has a higher transmission frequency. Both the user devices UE11 and UE12 receive the stereoscopic video stream of the visual angles V13 and V16 using BPSK, and obtain the stereoscopic video stream of original visual angles V14 and V15 respectively through video interpolation techniques.

Accordingly, simply by transmitting the stereoscopic video stream corresponding to the selected transmission visual angles VT1 to VT6 (i.e., original visual angles V1, V4, V7, V10, V13 and V16) to the corresponding user devices UE1 to UE13 through a wireless communications protocol, the wireless transmission device 110 enables the user devices UE1 to UE13 to generate the stereoscopic video stream of the desired visual angles from the stereoscopic video stream corresponding to the transmission visual angles VT1 to VT6. In detail, when the user visual angle (e.g., V1, V4, V7, V10, V13 or V16) of the user device (e.g., UE1, UE4, UE7, UE8, UE10 or UE13) is among the transmission visual angles VT1 to VT6, the user device directly obtains the stereoscopic video stream of the desired user visual angle through the wireless transmission device 110. On the other hand, when the user visual angle (e.g., V2, V3, V5, V6, V11, V14 or V15) of the user device (e.g., UE2, UE3, UE5, UE6, UE9, UE11 or UE12) is not among the transmission visual angles VT1 to VT6, the user device receives the stereoscopic video stream corresponding to the transmission visual angles adjacent to the user visual angle, and performs video interpolation on two received stereoscopic video streams so as to generate the stereoscopic video stream corresponding to the desired user visual angle.

Figure 5:
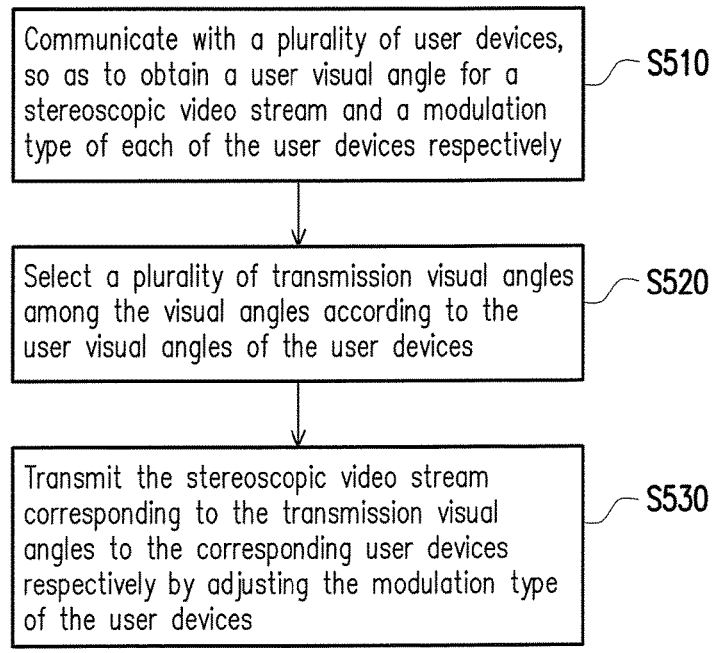
FIG. 5 is a flow chart of a wireless transmission method for stereoscopic video according to an embodiment of the invention.

FIG. 5 is a flow chart of a wireless transmission method for stereoscopic video according to an embodiment of the invention. Referring to both FIG. 1 and FIG. 5, in step S510, the wireless transmission device 110 communicates with a plurality of user devices UE1 to UE13, so as to obtain a user visual angle for a stereoscopic video stream and a modulation type of each of the user devices UE1 to UE13 respectively. Each of the user devices UE1 to UE13 is configured to receive the stereoscopic video stream corresponding to the user visual angle, and the stereoscopic video stream is composed of a plurality of views of a plurality of visual angles (e.g., V1 to V16). In step S520, the wireless transmission device 110 selects a plurality of transmission visual angles (e.g., the transmission visual angles VT1 to VT6 as shown in FIG. 4) among the visual angles V1 to V16 according to the user visual angles of the user devices UE1 to UE13. In step S530, the wireless transmission device 110 transmits the stereoscopic video stream corresponding to the transmission visual angles to the corresponding user devices UE1 to UE13 respectively by adjusting the modulation type of the user devices UE1 to UE13. Accordingly, the user devices UE1 to UE13 generate the stereoscopic video stream of the desired user visual angle using the stereoscopic video stream of the transmission visual angles VT1 to VT6.

Figure 6:
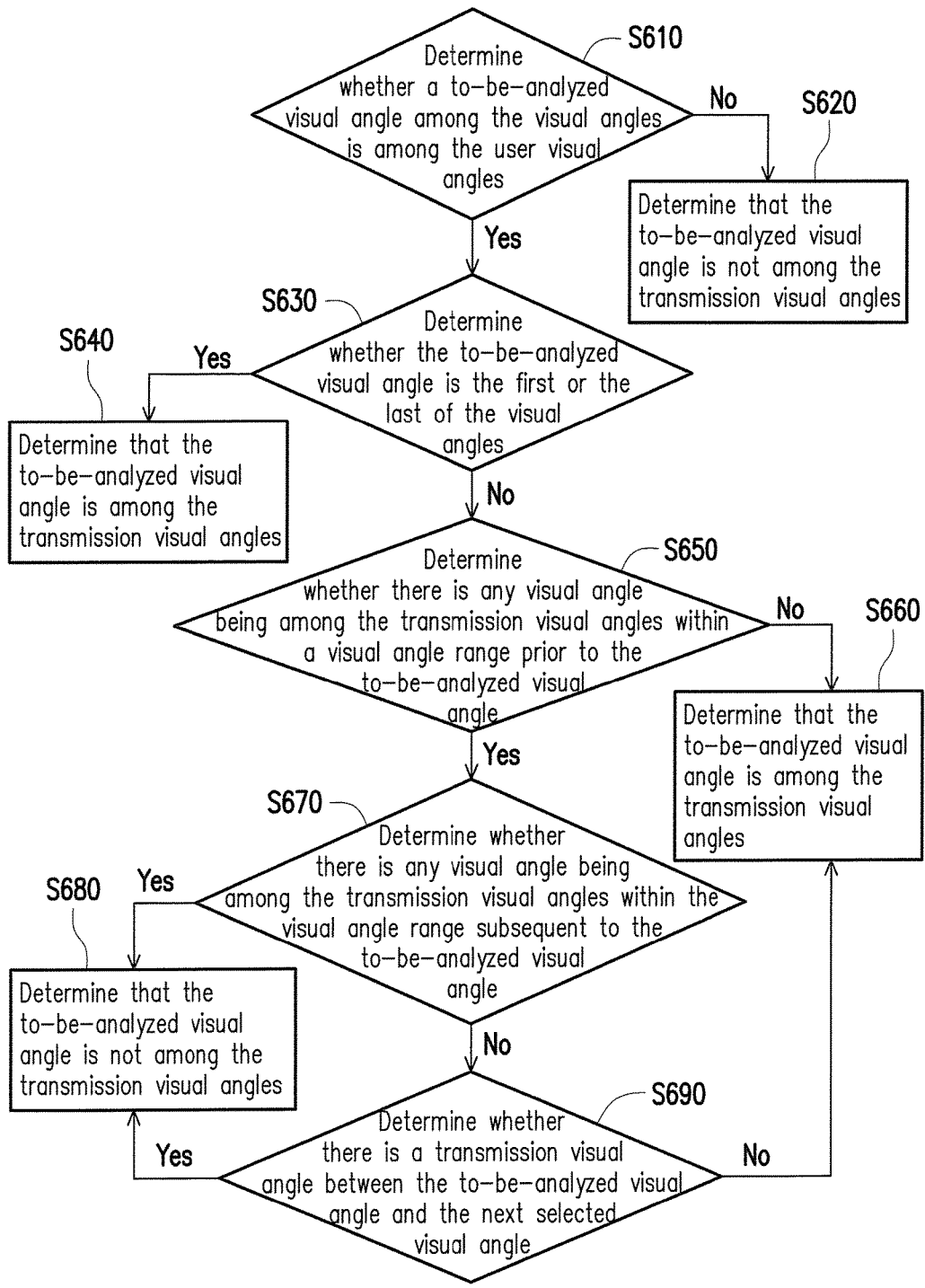
FIG. 6 is a detailed flow chart of step S530 in FIG. 5 according to an embodiment of the invention.

FIG. 6 is a detailed flow chart of step S530 in FIG. 5 according to an embodiment of the invention. In other words, the steps in FIG. 6 describe how the wireless transmission device 110 in FIG. 1 determines whether the visual angles are among the transmission visual angles one by one. Referring to FIG. 1 and FIG. 6, in step S610, the wireless transmission device 110 determines whether a to-be-analyzed visual angle among the visual angles is among the user visual angles corresponding to the user devices UE1 to UE13. If the decision in step S610 is NO, it means that there is no need to transmit this visual angle. Thus, the process goes to step S620, where it is determined that the to-be-analyzed visual angle is not among the transmission visual angles. If the decision in step S610 is YES, the process goes to step S630, where whether the to-be-analyzed visual angle is the first (i.e., visual angle V1) or the last (i.e., visual angle V16) of the visual angles is determined. If the decision in step S630 is YES, it means that video interpolation cannot be performed on the to-be-analyzed visual angle using visual angles on the left or right of the visual angle. Thus, the process goes to step S640, where it is determined that the to-be-analyzed visual angle is among the transmission visual angles.

If the decision in step S630 is NO, the process goes to step S650, where whether there is any visual angle being among the transmission visual angles within a visual angle range prior to the to-be-analyzed visual angle is determined. It is known from the present embodiment that the visual angle range is 3. Therefore, whether two visual angles prior to the to-be-analyzed visual angle are among the transmission visual angles is determined. If the decision in step S650 is NO, it means that there is no reference visual angle prior to the to-be-analyzed visual angle, and thus the stereoscopic video stream corresponding to the to-be-analyzed visual angle has to be transmitted. Thus, the process goes to step S660, where it is determined that the to-be-analyzed visual angle is among the transmission visual angles.

If the decision in step S650 is YES, the process goes to step S670, where whether there is any visual angle being among the transmission visual angles within the visual angle range subsequent to the to-be-analyzed visual angle is determined. Since the visual angle range is 3, and it is known in step S650 that a transmission visual angle is present prior to the to-be-analyzed visual angle, if a transmission visual angle is present within the visual angle range subsequent to the to-be-analyzed visual angle (i.e., if the decision in step S670 is YES), the stereoscopic video stream corresponding to the to-be-analyzed visual angle can be obtained from the stereoscopic video stream corresponding to the prior and subsequent transmission visual angles by video interpolation. Thus, the process goes to step S680, where it is determined that the to-be-analyzed visual angle is not among the transmission visual angles. On the other hand, if the decision in step S670 is NO, the process goes to step S690, where whether there is a transmission visual angle between the to-be-analyzed visual angle and the next user-selected visual angle is determined, wherein the transmission visual angle is within the visual angle range subsequent to the to-be-analyzed visual angle. If the decision in step S690 is YES, it means that the stereoscopic video stream corresponding to the to-be-analyzed visual angle can be obtained from the stereoscopic video stream corresponding to the prior and subsequent transmission visual angles by video interpolation. Thus, the process goes to step S680, where it is determined that the to-be-analyzed visual angle is not among the transmission visual angles. On the other hand, if the decision in step S690 is NO, the process goes to step S660, where it is determined that the to-be-analyzed visual angle is among the transmission visual angles.

Figure 7:
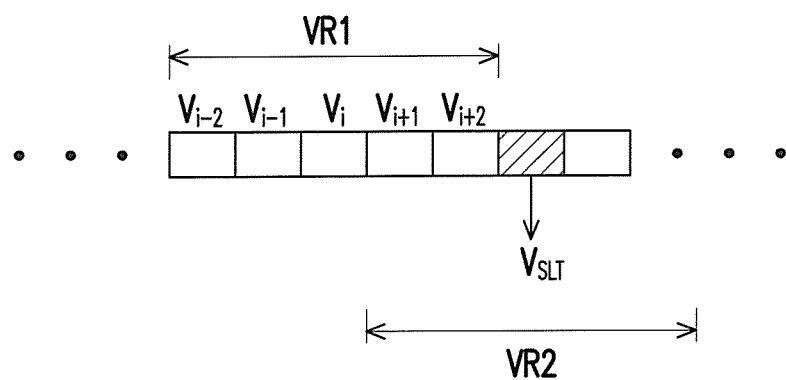
FIG. 7 is a schematic diagram of a to-be-analyzed visual angle and a user-selected visual angle in step S690 in FIG. 6.

A relationship between the to-be-analyzed visual angle and the next user-selected visual angle in step S690 is described in detail. FIG. 7 is a schematic diagram of a to-be-analyzed visual angle $V_i$ and a user-selected visual angle $V_{SLT}$ in step S690 in FIG. 6. Referring to FIG. 7, a visual angle range VR1 of the embodiments of the invention is set to 3. Accordingly, a stereoscopic video stream of the to-be-analyzed visual angle $V_i$ can be obtained from views of a left visual angle (e.g., visual angle $V_{i-1}$ or $V_{i-2}$) and a right visual angle (e.g., visual angle $v_{i+1}$ or $V_{i+2}$) with a difference of 2 or less therebetween. The selected visual angle $V_{SLT}$ is a visual angle specified by another user device for viewing. In determining whether the to-be-analyzed visual angle $V_i$ is among the transmission visual angles, if the selected visual angle $V_{SLT}$ is not within the visual angle range VR1 of the to-be-analyzed visual angle $V_i$, whether the visual angle $V_{i+1}$ is among the transmission visual angles cannot be directly determined. In order to determine whether the visual angle $V_{i+1}$ is among the transmission visual angles, the next user-selected visual angle $V_{SLT}$ subsequent to the to-be-analyzed visual angle $V_i$ has to be found. Then, whether the visual angles (e.g., visual angles $V_{i+1}$ and $V_{i+2}$) within a visual angle range VR2 of the selected visual angle $V_{SLT}$ are within the visual angle range VR1 of the to-be-analyzed visual angle $V_i$, and whether the visual angles have been selected by a user device are taken into consideration.

If the visual angle $V_{i+1}$ is within both the visual angle ranges VR1 and VR2, and the visual angle $V_{i+1}$ has been selected by a user device, in step S690, it is determined that the visual angle $V_{i+1}$ is among the transmission visual angles and that the to-be-analyzed visual angle $V_i$ is not among the transmission visual angles (because the stereoscopic video stream of the to-be-analyzed visual angle $V_i$ can be obtained by performing video interpolation on the view of the visual angle $V_{i+1}$). On the other hand, if the visual angle $V_{i+1}$ is not among the transmission visual angles, it is determined that the to-be-analyzed visual angle $V_i$ is among the transmission visual angles.

In summary, according to the embodiments of the invention, when a plurality of user devices are viewing a specific stereoscopic video stream of a plurality of visual angles at the same time through a wireless communications protocol, the wireless transmission device obtains a user visual angle of each user device for this specific stereoscopic video stream so as to select a transmission visual angle that has to be transmitted and its corresponding specific stereoscopic video stream. The user device that desires to receive the transmission visual angle (i.e., the user visual angle of the user device is among the transmission visual angles) directly receives the specific stereoscopic video stream corresponding to the transmission visual angle, while some of the user devices receive the specific stereoscopic video stream corresponding to the visual angles adjacent to their user visual angles and generate the specific stereoscopic video stream of their user visual angles by themselves using video interpolation techniques. Accordingly, by means of the wireless transmission system, method and device according to the embodiments of the invention, a plurality of user devices obtain their desired stereoscopic video stream without affecting resolution of the stereoscopic video stream, and network traffic and the bandwidth consumed in transmission of the stereoscopic video stream can be effectively reduced.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A wireless transmission system for stereoscopic video, comprising:
   a wireless transmission server; and
   a plurality of user computers communicating with the wireless transmission server,
   wherein each of the user computers is configured to receive a stereoscopic video stream corresponding to a user visual angle from the wireless transmission server, and the stereoscopic video stream is composed of a plurality of views of a plurality of visual angles,
   wherein the wireless transmission server obtains the user visual angle for the stereoscopic video stream and a modulation type of each of the user computers respectively, selects a plurality of transmission visual angles among the visual angles according to the user visual angles of the user computers, and transmits the stereoscopic video stream corresponding to the transmission visual angles to the corresponding user computers respectively by adjusting the modulation type of the user computers, wherein the user visual angle is determined by the wireless transmission server by inputs from the user computers, wherein when the user visual angle of the user computer is not among the transmission visual angles, the user computer receives the stereoscopic video streams corresponding to the transmission visual angles adjacent to the user visual angle, and performs video interpolation on the stereoscopic video streams corresponding to the transmission visual angles adjacent to the user visual angle, so as to generate the stereoscopic video stream corresponding to the user visual angle, wherein the modulation type is determined based on a distance between the wireless transmission server and each of the user computers or a degree of wireless transmission interference, and the modulation type is classified based on a transmission frequency, and each of the user computers receives the stereoscopic video stream transmitted using the modulation type having the transmission frequency not lower than a predetermined transmission frequency.

2. The wireless transmission system of claim 1, wherein each of the user computers comprises:
a 3D video display apparatus configured to display the stereoscopic video stream.

3. The wireless transmission system of claim 1, wherein the modulation type comprises one of binary phase-shift keying (BPSK), quadrature phase-shift keying (QPSK), 16 quadrature amplitude modulation (16QAM) and 64 quadrature amplitude modulation (64QAM).

4. The wireless transmission system of claim 1, wherein the wireless transmission server determines whether the visual angles are among the transmission visual angles one by one, so as to transmit the stereoscopic video stream corresponding to the transmission visual angles to the corresponding user computers respectively.

5. A wireless transmission method for stereoscopic video, comprising:
communicating, by a wireless transmission server, with a plurality of user computers so as to obtain a user visual angle for a stereoscopic video stream and a modulation type of each of the user computers respectively, wherein the each of the user computers is configured to receive the stereoscopic video stream corresponding to the user visual angle from the wireless transmission server, and the stereoscopic video stream is composed of a plurality of views of a plurality of visual angles;
selecting, by the wireless transmission server, a plurality of transmission visual angles among the visual angles according to the user visual angles of the user computers; and
transmitting, by the wireless transmission server, the stereoscopic video stream corresponding to the transmission visual angles to the corresponding user computers respectively by adjusting the modulation type of the user computers, wherein the user visual angle is determined by the wireless transmission server by inputs from the user computers,
wherein when the user visual angle of the user computer is not among the transmission visual angles, receiving the stereoscopic video streams corresponding to the transmission visual angles adjacent to the user visual angle, and performing video interpolation on the stereoscopic video streams corresponding to the transmission visual angles adjacent to the user visual angle, so as to generate the stereoscopic video stream corresponding to the user visual angle,
wherein the modulation type is determined based on a distance between a wireless transmission server and each of the user computers or a degree of wireless transmission interference, and the modulation type is classified based on a transmission frequency, and
each of the user computers receives the stereoscopic video stream transmitted using the modulation type having the transmission frequency not lower than a predetermined transmission frequency.

6. The wireless transmission method of claim 5, wherein the modulation type comprises one of binary phase-shift keying (BPSK), quadrature phase-shift keying (QPSK), 16 quadrature amplitude modulation (16QAM) and 64 quadrature amplitude modulation (64QAM).

7. The wireless transmission method of claim 5, wherein the step of selecting the transmission visual angles among the visual angles according to the user visual angles of the user computers comprises:
determining whether a to-be-analyzed visual angle among the visual angles is among the user visual angles, and if not, determining that the to-be-analyzed visual angle is not among the transmission visual angles;
determining whether the to-be-analyzed visual angle is the first or the last of the visual angles, and if so, determining that the to-be-analyzed visual angle is among the transmission visual angles;
determining whether there is any visual angle being among the transmission visual angles within a visual angle range prior to the to-be-analyzed visual angle, and if not, determining that the to-be-analyzed visual angle is among the transmission visual angles;
determining whether there is any visual angle being among the transmission visual angles within the visual angle range subsequent to the to-be-analyzed visual angle, and if so, determining that the to-be-analyzed visual angle is not among the transmission visual angles;
determining whether there is a transmission visual angle between the to-be-analyzed visual angle and a selected visual angle and whether the transmission visual angle is within the visual angle range subsequent to the to-be-analyzed visual angle, and if so, determining that the to-be-analyzed visual angle is not among the transmission visual angles; if not, determining that the to-be-analyzed visual angle is among the transmission visual angles.

8. A wireless transmission server for stereoscopic video, comprising:
a wireless transmission module communicating with a plurality of user computers, wherein each of the user computers is configured to receive a stereoscopic video stream from the wireless transmission server corresponding to a user visual angle, and the stereoscopic video stream is composed of a plurality of views of a plurality of visual angles; and
a processor coupled to the wireless transmission module, wherein the processor obtains the user visual angle for the stereoscopic video stream and a modulation type of each of the user computers respectively through the wireless transmission module, selects a plurality of transmission visual angles among the visual angles according to the user visual angles of the user computers, and transmits the stereoscopic video stream corresponding to the transmission visual angles from the wireless transmission server to the corresponding user computers respectively by adjusting the modulation type of the user computers, wherein the user visual angle is determined by the wireless transmission server by inputs from the user computers, wherein when the user visual angle of the user computer is not among the transmission visual angles, the user computer performs video interpolation on the stereoscopic video streams corresponding to the transmission visual angles adjacent to the user visual angle, so as to generate the stereoscopic video stream corresponding to the user visual angle, wherein the modulation type is determined based on a distance between the wireless transmission server and each of the user computers or a degree of wireless transmission interference, and the modulation type is classified based on a transmission frequency, and each of the user computers receives the stereoscopic video stream transmitted using the modulation type having the transmission frequency not lower than a predetermined transmission frequency.

9. The wireless transmission server of claim 8, wherein the modulation type comprises one of binary phase-shift keying (BPSK), quadrature phase-shift keying (QPSK), 16 quadrature amplitude modulation (16QAM) and 64 quadrature amplitude modulation (64QAM).

\* \* \* \* \*